United States Patent [19]

Kazumi et al.

[11] Patent Number: 4,952,967
[45] Date of Patent: Aug. 28, 1990

[54] TIMER-ASSISTED PHOTOGRAPHING MODE CONTROL DEVICE FOR CAMERA

[75] Inventors: Jiro Kazumi, Yokohama; Shinichi Tsujimoto, Tokyo; Masaaki Ishihara, Yokohama, all of Japan

[73] Assignee: Canon Kabushiki Kaisha, Tokyo, Japan

[21] Appl. No.: 262,355

[22] Filed: Oct. 25, 1988

[30] Foreign Application Priority Data

Oct. 27, 1987 [JP] Japan .................................. 62-271365
Jan. 19, 1988 [JP] Japan ...................................... 63-8693

[51] Int. Cl.$^5$ ............................................. G03B 17/38
[52] U.S. Cl. ................................... 354/442; 354/267.1
[58] Field of Search ...................... 354/418, 442, 267.1

[56] References Cited

U.S. PATENT DOCUMENTS

| | | | |
|---|---|---|---|
| 4,449,804 | 5/1984 | Watanabe et al. | 354/418 |
| 4,582,413 | 4/1986 | Suzuki et al. | 354/267.1 |
| 4,609,274 | 9/1986 | Iwashita et al. | 354/267.1 |
| 4,678,304 | 7/1987 | Kazumi | 354/267.1 |

FOREIGN PATENT DOCUMENTS

0077731 6/1980 Japan ............................... 354/267.1

Primary Examiner—Russell E. Adams
Attorney, Agent, or Firm—Fitzpatrick, Cella, Harper & Scinto

[57] ABSTRACT

A timer-assisted photographing mode control device for use in a camera of the type which has a timer circuit capable of delivering, at a predetermined time interval, signals relating to starting of a shutter releasing operation. When timer-assisted photographing operation is to be executed, a photographing mode suitable for the timer-assisted exposure is forcibly selected.

24 Claims, 8 Drawing Sheets

TIMER-ASSISTED PHOTOGRAPHING MODE CONTROL DEVICE FOR CAMERA

BACKGROUND OF THE INVENTION

1. Field of the Invention

The present invention relates to a timer-assisted photographing mode control device for a camera suitable for use in automatic intermittent and unmanned photography.

2. Description of Related Art

A typical known timer-assisted device for controlling the photographing mode of a camera will be described with reference to FIG. 1.

The device has a timer circuit 1 which is capable of producing a predetermined output at its output terminal b upon receipt of a signal of a high (H) level at its input terminal a. The device also has a D flip-flop 2 having an input terminal D and a clock terminal CLK. In response to each rise of the signal level at the clock terminal CLK, the flip-flop 2 latches the input signal which is input to the input terminal D and delivers the latched value through an output terminal Q while delivering an inverse output through another output terminal Q̄ thereof. The clock terminal CLK is grounded through a resistor 4 and is connected through a timer operation switch 3 to a power supply (not shown) which provides a source voltage of the H level. The output terminal Q is connected to the input terminal a of the timer circuit 1. A reference numeral 5 denotes a camera control circuit. When the level of the signal supplied to a first input terminal SW1 is reduced to a low (L) level, the camera control circuit 5 activates a camera control system so as to commence operation, such as photometry. When a signal of the H level is received by a second input terminal SW2, the camera control system conducts a shutter releasing operation. In addition, the camera control circuit 5 provides a trigger output terminal TRIG which delivers a pulse of the H level and has a constant duration in response to each shutter releasing operation. The trigger output terminal TRIG is connected to the input terminal c of the timer circuit 1. The timer circuit 1 counts the number of the pulses from the trigger output terminal TRIG and maintains an output of the H level at its output terminal b until the number of the pulses reaches a predetermined set value. A reference numeral 15 denotes a range-finding circuit of the camera. This circuit conducts a range-finding operation when a signal of a low (L) level is received by the input terminal SW1' thereof and, when an in-focus state is obtained, produces an output of the H level at its output terminal AFOK. The input terminal SW1' is grounded together with the first input terminal SW1 of the control circuit 5 through a first switch 10, while the output terminal AFOK is connected both to an AF output terminal AF of the control circuit 5 and one of the input terminals of a NOR circuit 13. The other input terminal of the NOR circuit 13 is connected to an AF mode switch 7 through an inverter 14. The output of the NOR circuit 13 is connected to one of the input terminals of an AND circuit having an inverter 12 (hereinafter referred to as an AND circuit 12) the other input terminal of which is connected both to a second switch 11 and a transistor 6. When the output terminal Q of the flip-flop 2 is set low, the timer circuit 1 does not operate so that the output terminal b of the timer circuit remains at the L level so as to keep the transistor 6 off. When the AF mode switch 7 is in an off state, the inverter 14 receives a signal of the H level so that it produces an output of the L level. Then, as the user presses a shutter release button of the camera, the first switch 10 is turned on so that the camera control circuit 5 and the range-finding circuit 15 start to operate.

As the shutter release button is further pressed, the second switch also is turned on. If the result of the range-finding operation shows that the camera is not in in-focus state, the range-finding circuit 15 delivers a signal of the L level at its output terminal AFOK so that the NOR circuit 13 receives inputs of the L level and, therefore, delivers an output of the H level. In consequence, the AND circuit continues to output a signal of the L level so that the camera does not begin the shutter releasing operation. Conversely, when an in-focus state is confirmed, the range-finding circuit 15 delivers an output of the H level at the output terminal AFOK thereof so that the output of the NOR circuit 13 is set to the L level. In consequence, the AND circuit 12 receives signals of the L level at its both input terminals so that it delivers an output of the H level, whereby the control circuit 5 conducts a shutter releasing operation.

On the other hand, if the AF mode switch 7 has been turned on, the inverter 14 delivers an output of the H level so that the output of the NOR circuit 13 is set to the L level regardless of the level of the signal from the output terminal AFOK of the range-finding circuit. Therefore, when the second switch 11 is turned on, signals of the L level are input to both input terminals of the AND circuit 12, thereby to commence the shutter releasing operation. It will be seen that the AF mode switch 7 has a function for changing the mode of AF operation of the camera. Namely, when this switch 7 is in an off state, the camera operates in a first AF mode in which the shutter is not released unless an in-focus state is confirmed, whereas, when this switch is in on the state, the camera operates in a second AF mode in which the shutter is released in response to pressing of the second switch 11 regardless of the focusing state. The first AF mode inhibits the exposure unless the object is correctly focused and locks the optical system once the in-focus state is obtained. This mode, therefore, is suitable for use in the cases where the distance between the camera and the object is unchanged or where the framing operation is executed while a main object is brought into focus. In particular, the second AF mode is effective in shooting a moving object because the optical system automatically focuses the object regardless of the movement. Thus, the user can selectively use these two AF modes in accordance with the type of the object to be photographed.

This known photographing mode control device suffers from the following problem. It is assumed here that the timer operation switch 3 is instantaneously turned on to start the timer while the AF mode switch 7 is in an off state. In such a case, if the output from the output terminal AFOK of the range-finding circuit 15 remains at the L level, i.e., if the camera is in an out-of-focus state, the shutter is not released even when the predetermined output is delivered from the output terminal b of the timer circuit 1, and the shutter is released only after the output from the output terminal AFOK of the range-finding circuit 15 is turned to the H level, i.e., only after the in-focus state is established. This seriously impairs the function of the timer, i.e., exposure for a preset shutter opening time. In consequence, the photographing operation may fail due to inadequate exposure.

Figure 2:
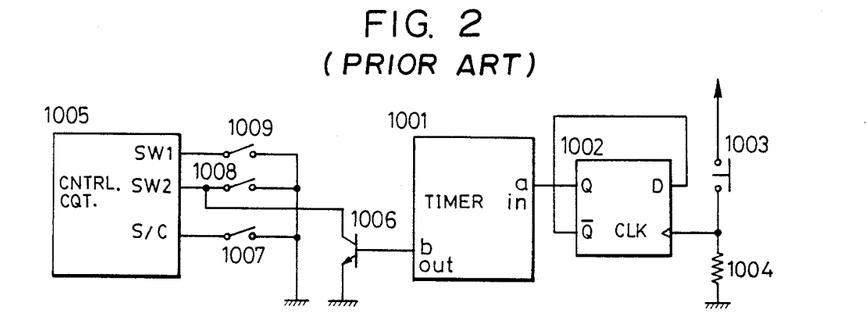
FIG. 2 is a block diagram of another known timer-assisted photographing mode control device for a camera.

FIG. 2 shows another known timer-assisted photographing mode control device.

This device has a timer circuit 1001 having an input terminal a and an output terminal b, a D flip-flop circuit 1002 having a clock terminal CLK which is grounded through a resistor 1004, a timer operation switch 1003, a camera control circuit 1005 and a transistor 1006. As the release button of the camera is pressed, a first switch 1009 is turned on so as to set a first input terminal AW1 of the control circuit 1005 to the L level thereby to start a camera system, thus commencing a photometry operation, a range-finding operation and other operations. As the release button is further depressed, a second switch 1008 is turned on so as to set a second input terminal SW2 of the control circuit 1005 at the L level, thereby executing a releasing operation. The control circuit 1005 also controls the operation of a film winding motor such as to enable the camera to operate selectively in a single-shot mode in which only one frame of film is exposed and a continuous-shooting mode in which consecutive frames are exposed. More specifically, when the S/C switch 1007 is turned on to set a third input terminal S/C to the L level, the control circuit 1005 selects the continuous shooting mode in which a shutter releasing operation and preparation for releasing, e.g., film feeding and shutter charging, are executed alternately as long as the second input terminal SW2 is set at the L level. Conversely, when the S/C mode switch 1007 is in off state, the third terminal S/C is not at the L level. In this case, the releasing operation is executed when the second input terminal SW2 is set to the L level followed by preparation for releasing. In this case, however, the next releasing operation is inhibited until both the first input terminal SW1 and the second input terminal SW2 are set to the L level. The state of the S/C mode switch 1007 is changeable manually by the photographer depending on whether the photographer wishes to conduct continuous photographing or wishes to avoid unintentional continuous photographing. Namely, when the continuous photographing is not necessary, the photographer operates the S/C mode switch 1007 such that the L level does not appear at the third input terminal S/C. In consequence, the camera operates in a single-shot mode. To take the next photograph, the photographer frees the release button to temporarily turn off the first and second switches 1009 and 1008 and then turns on these switches again.

On the other hand, when a signal of the H level is input to the input terminal a of the timer circuit 1001, the timer circuit 1001 delivers from its output terminal b a release signal composed of one, two, or more, pulses at a predetermined time interval. The release signal serves to turn the transistor 1006 on so as to set the second input terminal SW2 of the control circuit 1005 to the L level, thereby starting the shutter releasing operation. The input terminal a of the timer circuit 1001 is connected to the output terminal Q of a D flip-flop 1002. When the timer operation switch 1003 is turned on, a signal of the H level from a power supply (not shown) is delivered to the clock terminal CLK of the D flip-flop 1002. The flip-flop 1002 latches the input available at the input terminal D each time the level of the signal at the clock terminal CLK rises and delivers the latched value through its output terminal Q while returning the inverted output Q to the input terminal D.

Therefore, when the timer operation switch 1003 is turned on instantaneously, the Q output of the D flip-flop 1002 is inverted to the H level, so that the timer circuit 1001 produces a signal of the H level at its output terminal b at the predetermined time interval. In consequence, the transistor 1006 is turned on so that the second input terminal SW2 of the control circuit 1005 is set to the L level, whereby the camera conducts intermittent photography at the predetermined time interval. When the switch 1003 is turned on again, the timer circuit 1001 stops operating so that the intermittent photographing operation ceases.

The following problem is encountered with the photographing mode control device of FIG. 2.

Usually, the timer-assisted photography is conducted in an unmanned condition. Namely, the photographer leaves the camera after setting the camera in a timer-assisted photographing mode. In this photographing mode control device, the selection of operation mode is possible only through the manipulation of the S/C mode switch 1007. Namely, the photographer has to turn the S/C mode switch on before he leaves the camera, when he wishes to take a plurality of photographs at a predetermined time interval. Unfortunately, however, it often happens that the photographer forgets to turn the S/C mode switch 1007 on and becomes aware of this fact only after the set time has expired.

Figure 3:
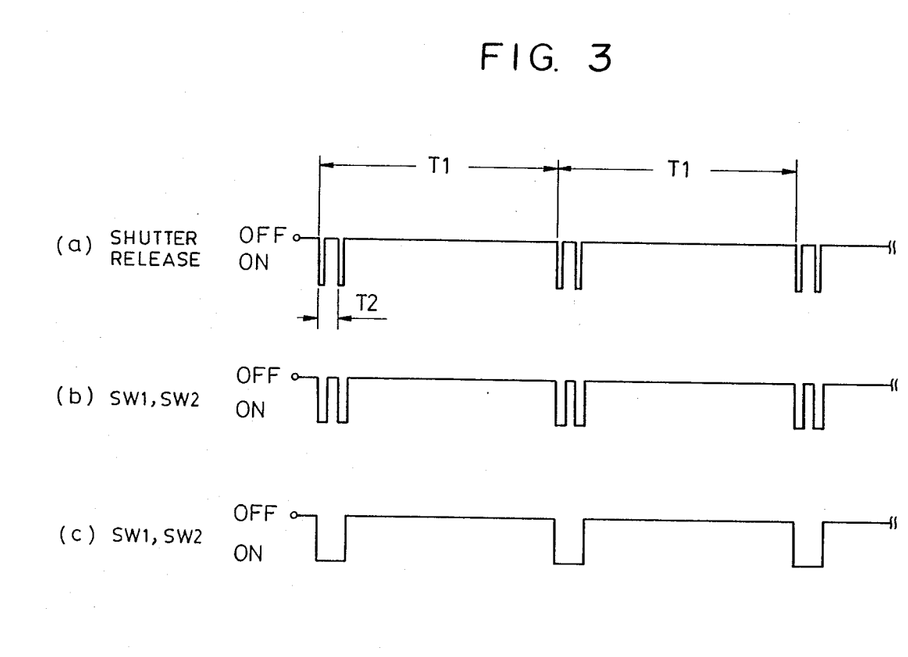
FIGS. 3(a) to 3(c) are timing charts explanatory of the operation of the device shown in FIG. 2.

A proposal has been made for the purpose of eliminating this disadvantage. According to this proposal, if the camera is set for intermittently taking photographs at a time interval $T_1$ such that two frames are exposed each time as shown in FIG. 3(a) while the third input terminal S/C has not been set to the L level, an on signal (the L level) and an off signal (the H level) are delivered to the first and second input terminals SW1 and SW2 of the control circuit 1005 from the timer circuit 1001, as shown in FIG. 3(b). This, however, requires a complicated control means which is capable of performing, before and after each time interval, a series of controlling operations including turning on of the first and second input terminals SW1 and SW2, detecting completion of the shutter releasing operation, keeping the first and second input terminals SW1 and SW2 in an off state for a predetermined period, turning on again the first and second input terminals SW1 and SW2, detecting completion of the shutter releasing operation, and turning the first and second switches SW1 and SW2. This complicated process undesirably prolongs the period $T_2$ between two shots in each shooting cycle.

If the levels of the signals at the first and second input terminals SW1 and SW2 are controlled as shown in FIG.3(c) while the third input terminal S/C has not been set at the L level, the camera only makes one photograph in each shooting cycle at the time interval $T_1$, thus failing to meet the photographer's expectations.

SUMMARY OF THE INVENTION

An object of the present invention is to provide a timer-assisted photographing mode control device for use in a camera having a plurality of interchangeable photographing modes, which is capable of forcibly setting a desired photographing mode when photography is to be conducted by means of a timer, thereby to overcome the above-described problems of the known timer-assisted photographing mode control devices.

To this end, according to one aspect of the present invention, there is provided a timer-assisted photographing mode control device for a camera, comprising: timer circuit means capable of automatically delivering signals relating to starting of a shutter releasing operation at a predetermined time interval; camera control circuit means having a plurality of control modes relating to the photographing operation; and change-over circuit means for forcibly selecting a predetermined mode from said plurality of control modes when timer-assisted photographing with the assist of said timer circuit is to be conducted.

According to another aspect of the present invention, a timer-assisted photographing mode control device for a camera is provided having a timer circuit means capable of automatically delivering, at a predetermined time interval, signals relating to starting a shutter releasing operation; camera control circuit means having a first operation mode which allows the shutter releasing operation to be executed only when the optical system of the camera is in an in-focus state; a second operation mode which allows the shutter releasing operation to be executed regardless of the state of focusing of the optical system; and a change-over circuit means for forcibly selecting the second operation mode from the plurality of operation modes of the camera control circuit means when a timer-assisted photographic operation is to be conducted.

According to a further aspect of the invention, a timer-assisted photographing mode control device for a camera is provided having a timer circuit means capable of automatically delivering, at a predetermined time interval, signals relating to starting a shutter releasing operation; camera control circuit means having a single-shot mode in which a shutter releasing operation and a subsequent shutter release preparation operation are executed in response to a shutter releasing operation, and a continuous-shooting mode in which the shutter releasing operation and the shutter releasing preparation operation are alternately repeated over a period in which the shutter release signal is continuously maintained; and a change-over circuit means for forcibly selecting the continuous-shooting mode when a timer-assisted photographing operation is to be conducted.

The above and other objects, features and advantages of the present invention will become clear from the following description of the preferred embodiments taken in conjunction with the accompanying drawings.

DESCRIPTION OF THE PREFERRED EMBODIMENTS

Preferred embodiments of the present invention will be described hereafter with reference to the accompanying drawings. In the following description of the preferred embodiments, the same reference numerals are used to denote the same or equivalent parts to those of the known devices described before, and a detailed description will be omitted in regard to such parts.

Figure 1:
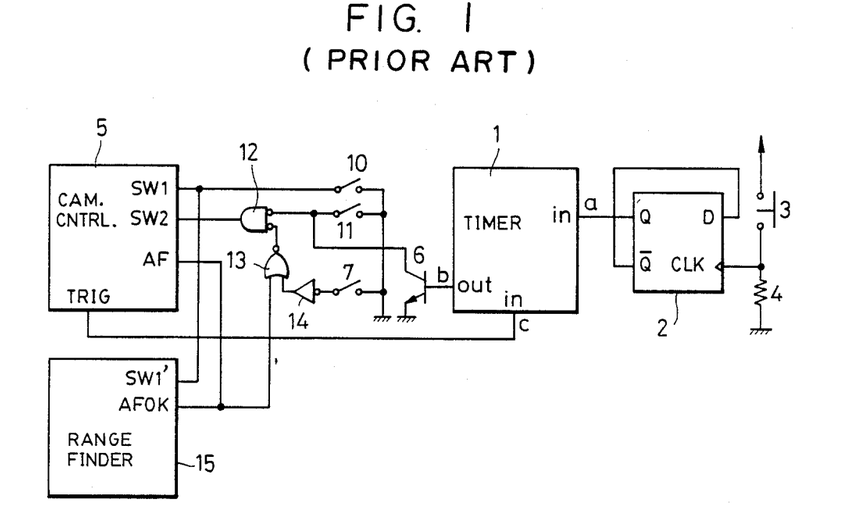
FIG. 1 is a block diagram of a known timer-assisted photographing mode control device for a camera.

FIG. 1 is a circuit diagram showing a first embodiment of the timner-assisted photographing mode control device of the present invention.

The device has a timer circuit 1 having an input terminal a which is connected to an output terminal Q of a flip-flop 2. A transistor 8 has a base which also is connected to the output terminal Q of the flip-flop 2 through a resistor 9. The collector of this transistor 8 is connected to the input side of the inverter 14.

Figure 4:
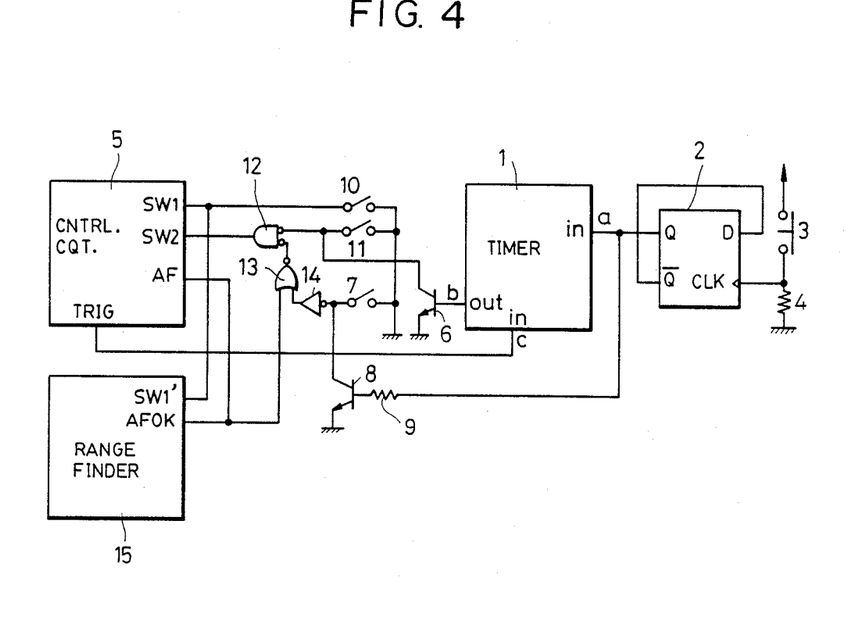
FIG. 4 is a block diagram of a first embodiment of the timer-assisted photographing mode control device in accordance with the present invention.

In the circuit shown in FIG. 4, when the level of the signal at the output terminal Q of the flip-flop 2 is the L level, the timer circuit 1 does not operate so that the output terminal b thereof is set at the L level and the transistor 6 is kept in an off state. In addition, if the AF mode switch 7 has been turned off, the level of the signal input to the inverter 14 is of the H level so that the inverter 14 delivers an output of the L level. When the first switch 10 is turned on in this state, the control circuit 5 and the range-finding circuit 15 are operated. If the result of the range-finding operation has proved that the camera is in an out-of-focus state, a signal of the L level is obtained at the output terminal AFOK of the range-finding circuit 15. Therefore, when the second switch 11 is turned on, both input terminals of the NOR circuit 13 receive signals of the L level so that the NOR circuit delivers an output of the H level. In this case, therefore, the output of the AND circuit 12 is held at the L level so that the shutter releasing operation does not take place.

Conversely, if the camera is in an in-focus state, signal of the H level is obtained at the output terminal AFOK of the range-finding circuit 15 so that the NOR circuit 13 outputs a signal of the L level. In consequence, signals of the L level are input to both input terminals of the AND circuit 12 so that the AND circuit 12 delivers an output of the H level so as to enable the control circuit 5 to conduct the shutter releasing operation.

On the other hand, if the AF mode switch 7 has been turned on, a signal of the H level is output from the inverter 14 so that the output of the NOR circuit 13 is set at the L level regardless of the level of the signal at the output terminal AFOK of the range-finding circuit 15. In this state, therefore, the shutter releasing operation is executed when the second switch 11 is turned on, because signals of the L level are received by both input terminals of the AND circuit 12.

If the timer operation switch 3 is instantaneously closed in this state, an inverted signal of the H level is obtained at the output terminal Q of the D flip-flop 2 and this output enables the timer circuit 1 to deliver a signal of the H level at a predetermined interval through its output terminal b as explained before. In addition, since the output terminal Q of the flip-flop 2 also is connected to the transistor 8, the transistor 8 is turned on to set the input to the inverter 14 at the L level regardless of the state of the AF mode switch 7.

In consequence, the output from the inverter 14 is set at the H level so that the output of the NOR circuit 13 is set to the L level. As the output terminal b of the timer circuit 1 is set at the H level in this state, signals of the L level are received by both input terminals of the AND circuit 12 as in the case where the AF mode switch 7 has been turned on, because the input to the inverter 14 is set at the L level. In consequence, the inverter 14 delivers an output of the H level thereby commencing the shutter releasing operation. The control circuit 5 delivers a single pulse of the H level to the trigger output terminal TRIG in response to each releasing operation and the timer circuit 1 maintains the output of the H level at its output terminal b until a predetermined number of pulses is counted. When the predetermined number is reached, the output terminal b of the timer circuit 1 is set to the L level whereby the shutter releasing operation is inhibited. Thus, the shutter releasing operation is repeated for a predetermined time, each time a predetermined time interval expires. When the timer operation switch 3 is turned on once again, the output terminal Q of the flip-flop 2 is inverted so that the timer circuit 1 stops operating and the transistor 8 is turned off.

Figure 5:
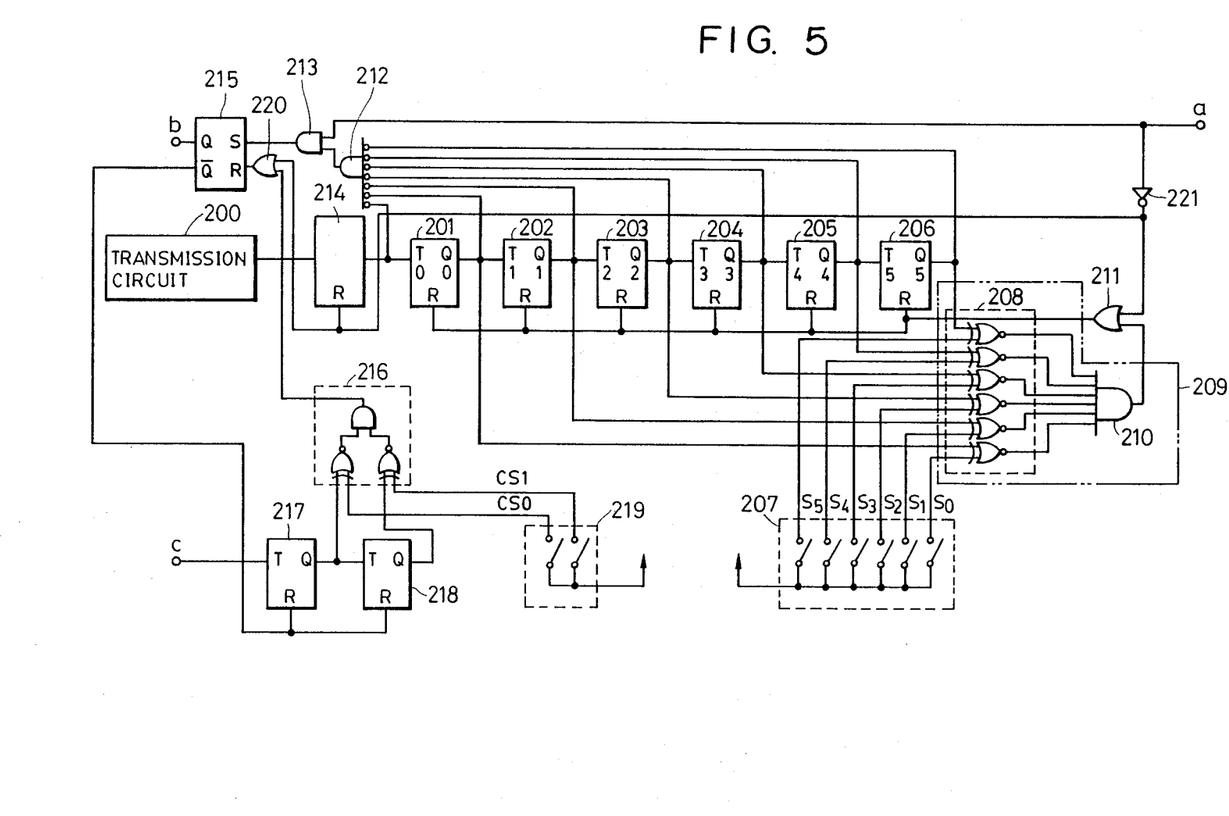
FIG. 5 is a circuit diagram of a timer circuit incorporated in the device shown in FIG. 1.

FIG. 5 is a circuit diagram showing the construction of the timer circuit 1. The timer circuit 1 has an oscillation circuit 200, and a demultiplier circuit 214 which demultiplies the output of the oscillation circuit 200. The arrangement is such that the demultiplication stages of the demultiplier circuit 214 are reset when a signal of the H level is received by the R terminal. The timer circuit 1 also has T flip-flops 201 to 206 which invert their outputs Q0 to Q5 each time the inputs T0 to T5 fall. In addition, the T flip-flops are so designed as to change the outputs Q to the L level when the R inputs of these flip-flops are set at the H level. The outputs Q are connected to the inputs T of the T flip-flops 201 to 206 which in combination constitute a frequency divider. The R inputs of the T flip-flops 201 to 206 are connected to the output of the OR circuit 211, while the outputs Q of the T flip-flops 201 to 206 are connected to an AND circuit 212 together with the frequency-dividing circuits 214. The outputs Q of the T flip-flops 201 to 206 also are connected to one of the input terminals of a first coincidence detection circuit 209 which is composed of an EXNOR circuit 208 and an AND circuit 210. The other of the input terminals of the EXNOR circuit 206 is connected to switching elements S0 to S5 of a timer setting switch 207 corresponding to the Q outputs of the T flip-flops 201 to 206. The other ends of the respective switching elements S0 to S5 of the switch 207 are connected to a power supply (not shown) capable of supplying signals of the H level. The first coincidence detection circuit 209 are arranged such that the AND circuit 210 thereof delivers a signal of the H level when a coincidence is obtained between the Q output values of the T flip-flops 201 to 206 and a value set by means of the switch 207. The output of the AND circuit 210 is connected to the input of the OR circuit 211. The other input of the OR circuit 211 is connected to the inverter 221. The output from the inverter 211 also is connected to the R input of the demultiplier circuit 214 and to the input of the OR circuit 220. Numerals 217 and 218 denote T flip-flops similar to the T flip-flop 201. The T input of the T flip-flop 217 is connected to the second input terminal c. The terminals a, b and c are the same as those in FIG. 4. The T input of the T flip-flop 218 is connected to the Q output of the T flip-flop 217 so as to form a 2-bit counter which is capable of counting the pulses at the second input terminal c. The Q outputs of the T flip-flops 217 and 218 are connected to a second coincidence detection circuit 216 which is designed to compare the value of the count performed by a counter constituted by the T flip-flops 217, 218 and the value set by means of the shooting number setting switch 219. Upon detection of coincidence, the coincidence detection circuit 216 delivers an output of the H level. This output is connected to the OR circuit 220. The switch 219 has a switching element CS0 for single-frame shooting and a switching element CS1 for double-frame shooting.

The AND circuit 212 is connected to one of the input terminals of the AND circuit 213 while the other input terminal of the AND circuit is connected to the terminal a. A latch circuit 215 composed of an SR flip-flop is capable of delivering a Q output of the H level when its S input receives a signal of the H level and a Q output of the L level when its R input receives a signal of the H level, while delivering an inverted output at its terminal Q. The input S of the latch circuit 215 is connected to the output of the OR circuit 220. The output Q of the latch circuit 215 is connected to the output terminal b while the output terminals Q of the latch circuit is connected to the R terminals of the T flip-flops 217 and 218. The T flip-flops 217 and 218 are so designed that they are reset to deliver outputs of the L level when signals of the H level are received by the R terminals thereof.

Referring to FIG. 5, when the input terminal a is set at the L level, the inverter 221 delivers an output of the H level so that the R terminal of the demultiplier circuit 214 is set to the H level so that the demultiplication stages have been reset. In addition, the outputs of the OR circuits 211 and 220 also are set to the H level so that the T flip-flops 201 to 206 are reset, as well as the latch circuit 215. In consequence, the output Q of the latch circuit 215 is set to the H level to set the output terminal b to the L level while resetting the T flip-flops 217 and 218.

If the photographer wishes to select a double-frame shooting mode, he turns the switching element CS1 of the switch 219 on to select this mode. Then, the time is set in the timer by means of the switching element S0 and S3 of the switch 207. In this case, the timer operates in a manner which will be explained later.

Figure 6:
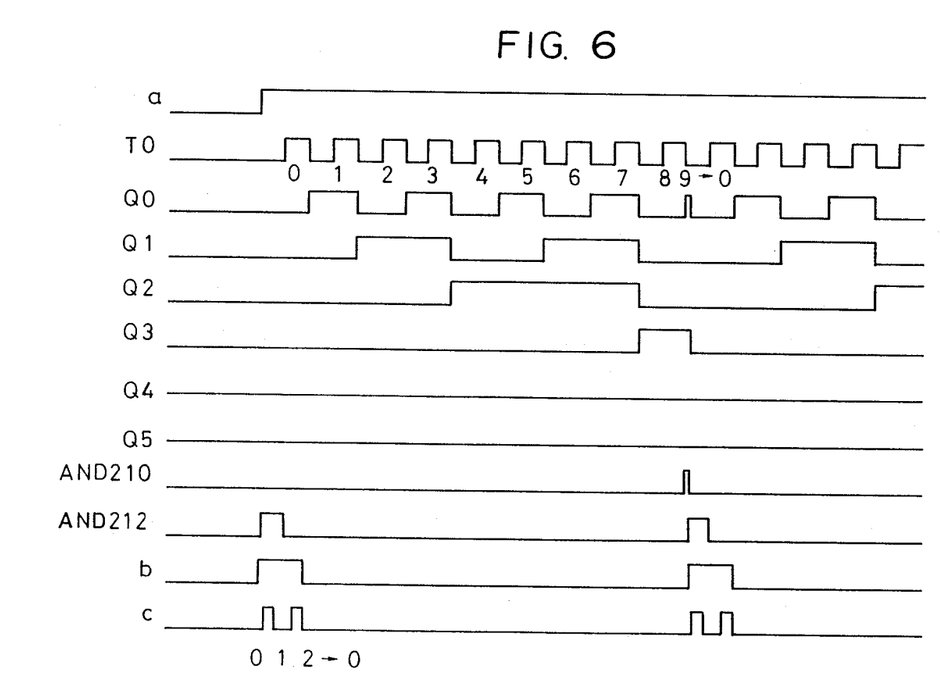
FIG. 6 is a timing chart explanatory of the operation of the timer circuit.

FIG. 6 is a timing chart illustrating the operation of the timer circuit. When the first input terminal a is set to the H level, the R terminal of the demultiplier circuit 214 is set to the L level so that the demultiplier circuit 214 starts the demultiplying operation so as to deliver a signal of a waveform indicated at T0 in FIG. 6.

In this state, the switching elements S0 to S5 of the switch 207 have been set at the H, L, L, H, L and the L levels, respectively, while the outputs of all the T flip-flops 201 to 206 are at the L level, so that the coincidence detection circuit 209 delivers output of the L level. Since both input terminals of the OR circuit 211 receive signals of the L level, the OR circuit 211 delivers an output of the L level, so that the T flip-flops 201 to 206 are not reset. Meanwhile, the output of the AND circuit 212 is set to the H level so that the output from the AND circuit 213 is set at the H level and the output Q (terminal b) of the latch circuit 215 is set at the H level because both input terminals of the AND circuit 213 receive signals of the H level.

In this state, the Q output of the latch circuit 215 is set to the L level so that the pulses supplied to the terminal c are counted by the flip-flops 217 and 218. In this state, the switching element CS0 and the switching element CS1 of the switch 219 are in the off and on states, respectively, so that the second coincidence detection circuit 216 is allowed to deliver an output of the H level when two pulses are input to the terminal c. In response to this signal, the output of the OR circuit 220 is set to the H level so that the latch circuit 215 is reset to deliver signals of the L and the H levels at the Q output (b terminal) and Q terminal, respectively. The Q output of the H level causes the T flip-flops 217 and 218 to be reset again. On the other hand, since the output from the AND circuit 210 is still maintained at the L level, the R inputs of the T flip-flops 201 to 206 also are maintained at the L level. In consequence, the demultiplier composed of the flip-flops 201 to 206 continues to demultiply the output from the demultiplier circuit 214 as shown in FIG. 6. It is assumed here that the demultiplication is conducted until the Q0 and Q3 of the flip-flops 201 and 204 are set to the H level while the Q outputs of other flip-flops are set to the L level. In such a case, the switching elements S0 and S3 of the switch 207 are on while other switching elements are off. In consequence the EXNOR gates of the EXNOR circuits 208 receive input signals of the same level so that both input terminals of the AND circuit 210 receive signals of the H level. In consequence, an output of the H level is derived from the OR circuit 211 so that all the T flip-flops 201 to 206 are reset, whereby inputs of the L level are delivered to the inputs of the AND circuit 212 to cause the AND circuit 212 to deliver an output of the H level. In consequence, the latch circuit 215 is latched as is the case where the first input terminal a is set at the H level. Then, the operation described hereinbefore is repeated.

When the first input terminal a is set to the L level, the S and R inputs of the latch circuit 215 are set to L and H, respectively, so that all the flip-flops 201 to 206, 217 and 218, as well as the demultiplier circuit 214, are reset. Thus, in the described circuit, when the input a is set at the H level, a signal of the H level is obtained at the terminal b at a time interval which has been set by means of the switch 207, and a signal of the L level is obtained at the terminal b when the number of the pulses received by the second input terminal c has reached the number which has been set through the switch 219.

As has been described, the first embodiment of the present invention is so designed that, whenever the timer-assisted photographing mode is selected, the camera control circuit is automatically set to operate in the second mode which enables the shutter to be released regardless of whether the camera is in an in-focus or out-of-focus state, thereby ensuring that shooting is conducted without fail at the time interval set in the timer means.

A second embodiment of the timer-assisted photographing mode control device of the present invention now will be described.

Figure 7:
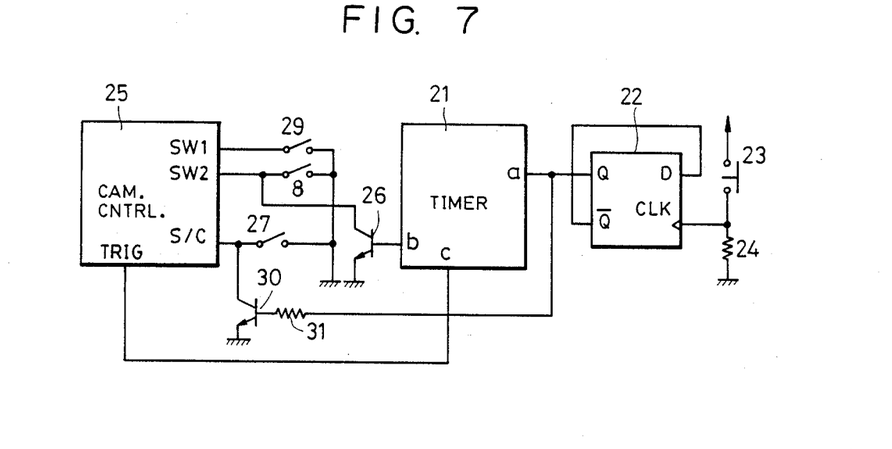
FIG. 7 is a block diagram of a second embodiment of the device in accordance with the present invention.

Referring to FIG. 7, the second embodiment of the device in accordance with the present invention has a timer circuit 21 provided with a first input terminal a, a second input terminal c and an input terminal b and a D flip-flop 22 having a clock terminal CLK which is grounded through a resistor 24. Reference numeral 23 denotes a timer operation switch. A camera control circuit 25 has a first input terminal SW1, a second input terminal SW2, a third input terminal S/C and a trigger output terminal TRIG. A first transistor, a second transistor and a resistor are denoted by numerals 26, 30 and 31, respectively. The arrangement is such that, when the shutter release button of the camera is pressed, the first switch 29 is turned on so as to change the level of the first input terminal SW1 to L, whereby the camera system begins to execute necessary operations such as the photometry operation and a range-finding operation. Then, as the release button is further depressed, the second switch 28 is turned on so that the second input terminal SW2 of the control circuit 25 is changed to the L level thereby allowing the shutter to be released.

The control circuit 25 has a function for controlling the film winding motor so as to enable the photographer to make a selection between single-shot mode in which only one frame is exposed and a continuous-shooting mode in which a plurality of frames are exposed. More specifically, when the S/C mode switch 27 is turned on to set the third input terminal S/C to the L level, the control circuit 25 selects the continuous-shooting mode so that the shutter releasing operation and the releasing preparation operation are alternately executed as long as the second input terminal SW2 is maintained at the L level, whereas, when the S/C mode switch is in off state, the third input terminal S/C is not at the L level so that the releasing operation is executed when the second input terminal SW2 is set to the L level followed by a releasing preparation operation. In the latter case, however, the releasing operation is not conducted until both the first input terminal SW1 and the second input terminal SW2 are temporarily set to the L level. When the shutter releasing operation is completed, a release completion signal in the form of a single pulse is delivered from the trigger output terminal TRIG to the second input terminal c of the timer circuit 1. The state of the S/C mode switch 27 is manually changeable by the photographer depending on whether he wishes to conduct continuous shooting or to avoid unnecessary continuous shooting. Namely, when the photographer wishes to avoid unnecessary continuous shooting, the photographer operates the S/C mode switch 27 such that the third input terminal S/C is not set at the L level so that the camera operates in the single-shot mode. When taking the next photograph, the photographer has to free the release button so as to temporarily turn off the first and the second switches and then to turn these switches on once again.

On the other hand, the timer circuit 21 produces, when a signal of the H level is received at the first input terminal a thereof, a release signal in the form of one or more pulses at a predetermined time interval through its output terminal b so as to turn off the first transistor 26 thereby setting the second input terminal SW2 of the control circuit 25 to the L level, thus executing the releasing operation. Meanwhile, release completion pulse signals derived from the trigger terminal TRIG of the control circuit 25 are counted and the delivery of the releasing signal through the output terminal b is continued until the counted number becomes equal to the number of the releasing pulse signals which has been set in advance.

The first input terminal a of the timer circuit 21 is connected to the output terminal Q of the D flip-flop 22. As the timer operation witch 23 is turned on, the signal of the H level from a power supply (not shown) is input to the clock terminal CLK of the D flip-flop so that the flip-flop 22 latches the signal received at its D input in response to each rise of the level at the clock terminal CLK and delivers this value through the output terminal Q while inputting an inverted signal Q to the input terminal D.

When a signal of the H level is output from the output terminal Q of the D flip-flop 22, the second transistor 30 is turned on so as to change the level of the third input terminal S/C of the control circuit 25 to the L level.

Figure 8:
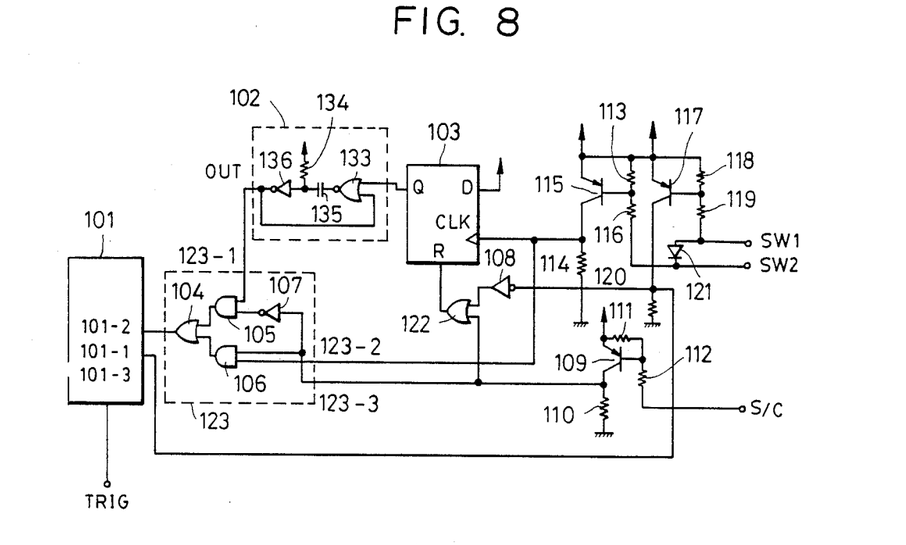
FIG. 8 is a circuit diagram of a control circuit incorporated in the device of FIG. 7.

FIG. 8 is a circuit diagram showing the control circuit 25 of the camera. The circuit 25 has a controller 101 having an input terminal 101-1. When a signal of the H level is received at the input terminal 101-1, the camera control circuit 101 starts the camera system so as to commence necessary operations, such as a photometry operation and a range-finding operation. When the input terminal 101-2 is set to the H level, the camera system alternately repeats the shutter releasing operation and the preparation operation as long as this the H level is maintained. The input terminal 101-1 is connected to the collector of the transistor 117, while the input terminal 101-2 is connected to the output of the multiplexer 123 which is composed of an OR gate 104, AND gates 105, 106 and an inverter 107. The multiplexer 123 selects the signal from the input terminal 123-2 when the input terminal 123-3 thereof is set at the H level, whereas, when the input terminal 123-3 is set at the L level, it selects the signal obtained at the input terminal 123-1. The input terminal 123-3 is connected to the collector of the transistor 109 the base of which is connected to the input terminal S/C through a resistor 112. The input terminal 123-1 is connected to the output terminal OUT of a monostable multivibrator 102 which is composed of OR gate 133, resistor 134, capacitor 135 and an inverter 136. The monostable multivibrator 102 is designed such that, when it receives a signal of the H level at its input terminal, it delivers through its output terminal a single pulse of a predetermined duration for effecting a single releasing operation. The input of the monostable multivibrator 102 is connected to the output terminal Q of a reset-type D flip-flop 103 the D input of which is fixed at the H level. The D flip-flop 103 is so designed that, when a rise to the H level exists at the clock terminal CLK thereof, it delivers a signal of the H level through its output terminal Q and maintains this output until a signal of the H level is received through the reset terminal R. The clock terminal CLK of the D flip-flop 103 is connected to the collector of the transistor 115 and also to the input terminal 123-2 of the multiplexer 123.

The reset terminal R of the D flip-flop 103 is connected to the output of the OR gate 122. The OR gate has two outputs one of which is connected to the collector of the transistor 109 while the other is connected to the collector of the transistor 117 through the inverter 108. The arrangement is such that the collectors of the transistors 109, 115 and 117 are set to the L level when the terminals of the third input terminal S/C, second input terminal SW2 and the first input terminal SW1 are set to the L level.

The first input terminal SW1 and the second input terminal SW2 are connected together through a diode 121 so that the first input terminal SW1 is set to the L level when the level of the second input terminal SW2 is changed to the L level. Reference numerals 110 to 114, 118 and 119 denote resistors.

In operation, when the switch 23 of FIG. 7 is temporarily turned on, the output Q of the D flip-flop 22 is inverted so that it delivers a signal of the H level. In response to this output, the timer circuit 21 delivers signals of the H level at a predetermined interval through the output terminal b thereof. In this state, the output from the D flip-flop 22 is set to the H level so that the second transistor 30 is turned on and the third input terminal S/C of the camera control circuit 25 is set to the L level regardless of the state of the switch 27. As a result, the transistor 109 (see FIG. 8) is turned on so that its collector is set to the H level so as to enable the multiplexer 123 to transmit the signal of the collector of the transistor 115 to the control circuit 101.

When the timer circuit 21 changes the level of the output terminal b to the H level, the first transistor 26 is turned on so that the second input terminal SW2 is set to the L level. In consequence, the transistor 115 is turned on and the transistor 117 also is turned on by the operation of the diode 121, whereby the collectors of the transistors 115 and 117 are set to the H level. As explained before, the signal from the collector of the transistor 115 is being received by the input terminal of the control circuit 101 so that both the input terminals 101-1 and 101-2 are set to the H level. In consequence, the shutter releasing operation and the release preparation operation are executed alternately. The control circuit 101 delivers through its output terminal 101-3 an output pulse in response to each releasing operation. The pulses are counted by the timer circuit 21 which maintains the H level at the output terminal b until the counted value becomes equal to the set value. In consequence, the camera operates in a continuous-shooting mode at a predetermined time interval so as to take a predetermined number of photographs in each photographing period.

Then, as the switch 23 is temporarily turned on again, the output of the D flip-flop is inverted so that the level of the output terminal Q is changed to L. In consequence, the timer circuit 21 stops to operate so that the level of the output terminal b is changed to L and the second transistor 30 is turned off.

Thus, when the timer is not operating, the level of the third input terminal S/C is determined by the state of the switch 27. Namely, when the switch 27 is in the on state, the shutter releasing operation and the preparation operation are alternately executed as long as the second input terminal SW2 is set at the L level, as is the case where the timer is operating. Conversely, when the switch 27 is in an off state, the transistor 109 in FIG. 8 remains off so that the multiplexer 123 transmits the signal of the input terminal 123-1 to the control circuit 101. Then, as the switch 28 is turned on so as to set the second input terminal SW2 to the L level, the transistor 115 is turned on so that the clock input of the D flip-flop 103 is changed to the H level. In this state, the first input terminal SW1 also has been set at L the level so that the transistor 117 also is turned on with the result that the input to the inverter 108 also is changed to the H level. Meanwhile, the transistor 109 has been turned off so that both input terminals of the OR gate are set to the L level. Therefore, the R terminal of the D flip-flop 103 is changed to the L level while the output terminal Q of the D flip-flop 103 is changed to the H level. In response to the H level signal from the Terminal Q, the monostable multivibrator 102 operates so as to maintain the output thereof at the H level for a predetermined period of time. This signal is transmitted through the multiplexer 123 to the control circuit 101 so that shutter releasing operation is executed followed by the releasing preparation operation. After the completion of the releasing preparation operation, the transistor 117 remains off if either one of the first and the second input terminals SW1 and SW2 are at the L level. In such a case, the output of the D flip-flop 103 is kept at the H level so that the monostable multivibrator 102 does not operate. In consequence, the control circuit 101 does not initiate the shutter releasing operation. When both the first and second input terminals are at the H level is obtained, the transistor 117 is turned off so that the output from the inverter 108 is changed to the H level with the result that the output from the OR gate is set at the H level. In consequence, the D flip-flop 103 is reset again so as to provide an output of the L level at its output terminal Q. If the second input terminal SW2 is changed to the L level, the D flip-flop 103 is set once again so as to repeat the above-described operation, i.e., the shutter releasing operation is executed once each time the second input terminal SW2 is set to the L level.

Figure 9:
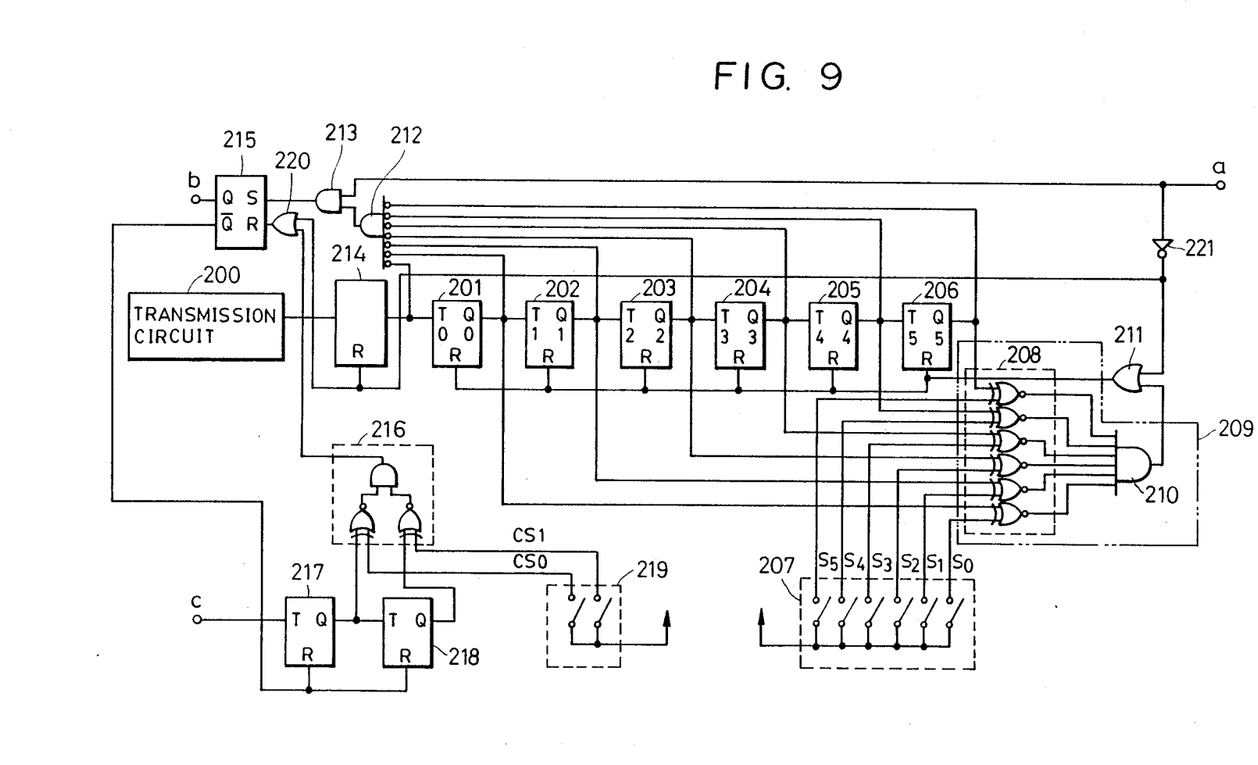
FIG. 9 is a circuit diagram of a timer circuit incorporated in the device of FIG. 7.

FIG. 9 is a circuit diagram showing the construction of the timer circuit 21. Since this circuit is materially the same as that shown in FIG. 5, the same reference numerals are used to denote the same parts or elements and a detailed description thereof is omitted.

The operation of the timer will be described with reference to a timing chart shown in FIG. 10. It is assumed here that the photographer has turned on the switching element CS1 of the switch 219 so as to select the double-frame exposure mode, and has set a predetermined time in the timer by turning on the switching element S0 and S3 of the switch 207.

Figure 10:
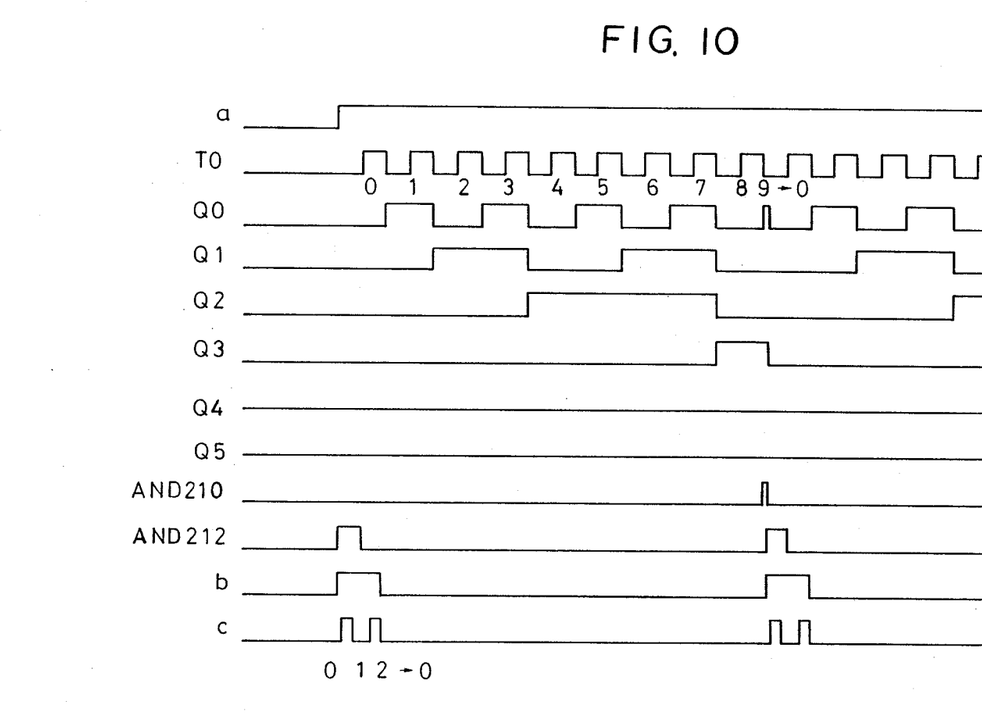
FIG. 10 is a timing chart illustrative of the operation of the timer circuit of FIG. 9.

Referring to the timing chart of FIG. 10, when the first input terminal a is set to the H level, the R terminal of the demultiplier circuit 214 is set to the L level so that the demultiplier circuit 214 starts the demultiplying operation so as to deliver a signal of the waveform indicated at T0 in FIG. 10.

In this state, the switching elements S0 to S5 of the switch 207 have been set at the H, L, L, H, L and L levels, respectively, while the outputs of all the T flip-flops 201 to 206 are at the L level, so that the coincidence detection circuit 209 delivers an output of the L level. Since both input terminals of the OR circuit 211 receive signals of the L level, the OR circuit 211 delivers an output of the L level, so that the T flip-flops 201 to 206 are not reset. Meanwhile, the output of the AND circuit 212 is set to the H level so that the output from the AND circuit 213 is set to the H level and the output Q (terminal b) of the latch circuit 215 is set to H because both input terminals of the AND circuit 213 receive signals of the H level.

In this state, the Q output of the latch circuit 215 is set to the L level so that the pulses supplied to the terminal c are counted by the flip-flops 217 and 218. In this state, the switching element CS0 and the switching element CS1 of the switch 219 are in the off and on states, respectively, so that the second coincidence detection circuit 216 is allowed to deliver an output of the H level when two pulses are input to the terminal. In response to this signal, the output of the OR circuit 220 is set to the H level so that the latch circuit 215 is reset to deliver signals of the L and the H levels at the Q output (b terminal) and Q terminal, respectively. The Q output of the H level causes the T flip-flops 217 and 218 to be reset again. On the other hand, since the output from the AND circuit 210 is still maintained at the L level, the R inputs of the T flip-flops 201 to 206 also are maintained at the L level. In consequence, the demultiplier composed of the flip-flops 201 to 206 continues to demultiply the demultiplied output from the demultip- lier circuit 214 as shown in FIG. 10. It is assumed here that the demultiplication is conducted until the Q0 and Q3 of the flip-flops 201 and 204 are set to the H level while the Q outputs of other flip-flops are set to the L level. In such a case, the switching elements S0 and S3 of the switch 207 are on while other switching elements are off. In consequence, the EXNOR gates of the EXNOR circuits 208 receive input signals of the same level so that both input terminals of the AND circuit 210 receive signals of the H level. In consequence, an output of the H level is derived from the OR circuit 211 so that all the T flip-flops 201 to 206 are reset, whereby inputs of the L level are delivered to the inputs of the AND circuit 212 to cause the AND circuit 212 to deliver an output of the H level. In consequence, the latch circuit 215 is latched as is the case where the first input terminal a is set at the H level. Then, the operation described hereinbefore is repeated.

When the first input terminal a is set to the L level, the S and R inputs of the latch circuit 215 are set to the L level and the H level, respectively, so that all the flip-flops 201 to 206, 217 and 218, as well as the demultiplier circuit 214, are reset. Thus, in the described circuit, when the input a is set at the H level, a signal of the H level is obtained at the terminal b at a time interval which has been set by means of the switch 207, and the signal of the L level is obtained at the terminal b when the number of the pulses received by the second input terminal c has reached the number which has been set through the switch 219.

As will be understood from the foregoing description, the second embodiment of the present invention offers the following advantage. Namely, the camera is automatically set to a mode for conducting continuous shooting whenever the time photography mode is selected so that a plurality of photographs can be taken in a set time without fail. This can be achieved without requiring any additional complicated circuit because the switching of the camera control means to the continuous-shooting mode is effected by the timer operation signal derived from the timer operation means.

The individual components shown in outline or designated by blocks in the Drawings are all well known in the timer-assisted photograph mode control arts and their specific construction and operation is not critical to the operation or best mode for carrying out the invention.

While the present invention has been described with respect to what is presently considered the preferred embodiments, it is to be understood that the invention is not limited to the described embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A timer-assisted photographing mode control device for a camera, comprising:
   (a) timer circuit means capable of automatically delivering a signal relating to starting of a plurality of exposure operations to effect at least one photographing operation during a predetermined time interval;
   (b) camera control circuit means having a plurality of operation modes relating to photographing; and (c) change-over circuit means for forcibly selecting a predetermined mode from said plurality of operation modes of said camera control circuit means when a timer-assisted photographing operation is to be conducted.

2. A device according to claim 1, wherein said change-over circuit means is automatically reset to an initial condition when the timer-assisted photographing operation terminates.

3. A device according to claim 1, wherein said timer circuit means is capable of delivering, in each of a plurality of periods which are set at a predetermined time interval, signals relating to starting of a plurality of cycles of the exposure operation.

4. A device according to claim 1, wherein said timer circuit means includes a circuit which is capable of varying the time interval of delivery of the signals.

5. A timer-assisted photographing mode control device for a camera, comprising:
  (a) timer circuit means capable of automatically delivering signals relating to starting of a plurality of exposure operations to effect at least one photographing operation during a predetermined time interval;
  (b) camera control circuit means having a first operation mode which allows the exposure operation to be executed only when the optical system of said camera is in an in-focus state, and a second operation mode in which it allows the exposure operation to be executed regardless of the state of focusing of said optical system; and
  (c) change-over circuit means for forcibly selecting the second operation mode from said plurality of operation modes of said camera control circuit means when a timer-assisted photographing operation is to be conducted.

6. A device according to claim 5, wherein said change-over circuit means is automatically reset to initial condition when timer-assisted photographing operation terminates.

7. A device according to claim 5, wherein said timer circuit means is capable of delivering, in each of a plurality of periods which are set at a predetermined time interval, signals relating to starting of a plurality of cycles of the exposure operation.

8. A device according to claim 5, wherein said timer circuit means includes a circuit which is capable of varying the time interval of delivery of the signals.

9. A timer-assisted photographing mode control device for a camera, comprising:
  (a) timer circuit means capable of automatically delivering signals relating to starting of a plurality of exposure operations to effect at least one photographing operation during a predetermined time interval;
  (b) camera control circuit means having a single-shot mode in which an exposure operation and a subsequent exposure preparation operation are executed in response to exposure start signal which is produced in response to an exposure operation, and a continuous-shooting mode in which the exposure operation and the exposure preparation operation are alternately repeated over a period in which the exposure start signal is continuously maintained; and
  (c) change-over circuit means for forcibly selecting the continuous-shooting mode when a timer-assisted photographing operation is to be conducted.

10. A device according to claim 9, wherein said change-over circuit means is automatically reset to an initial condition when the timer-assisted photographing operation terminates.

11. A device according to claim 9, wherein said timer circuit means is capable of delivering, in each of a plurality of periods which are set at a predetermined time interval, signals relating to starting of a plurality of cycles of the exposure operation.

12. A device according to claim 9, wherein said timer circuit means comprises means for varying said time interval of delivery of said signal.

13. A camera having a timer-assisted photographing mode control device, comprising:
  (a) timer circuit means capable of automatically delivering signals relating to starting of a plurality of exposure operations to effect at least one photographing operation during a predetermined time interval;
  (b) camera control circuit means having a plurality of operation modes relating to photographing; and
  (c) change-over circuit means for forcibly selecting a predetermined mode from said plurality of operation modes of said camera control circuit means when a timer-assisted photographing operation is to be conducted.

14. A camera according to claim 13, wherein said change-over circuit means is automatically reset to an initial condition when the timer-assisted photographing operation terminates.

15. A camera according to claim 13, wherein said timer circuit means is capable of delivering, in each of a plurality of periods which are set at a predetermined time interval, signals relating to starting of a plurality of cycles of the exposure operation.

16. A camera according to claim 13, wherein said timer circuit means includes a circuit which is capable of varying the time interval of delivery of the signals.

17. A camera having a timer-assisted photographing mode control device, comprising:
  (a) timer circuit means capable of automatically delivering signals relating to starting of a plurality of exposure operations to effect at least one photographing operation during a predetermined time interval;
  (b) camera control circuit means having a first operation mode which allows the exposure operation to be executed only when the optical system of said camera is in an in-focus state, and a second operation mode in which it allows the exposure operation to be executed regardless of the state of focusing of said optical system; and
  (c) change-over circuit means for forcibly selecting the second operation mode from said plurality of operation modes of said camera control circuit means when a timer-assisted photographing operation is to be conducted.

18. A camera according to claim 17, wherein said change-over circuit means is automatically reset to initial condition when timer-assisted photographing operation terminates.

19. A camera according to claim 17, wherein said timer circuit means is capable of delivering, in each of a plurality of periods which are set at a predetermined time interval, signals relating to starting of a plurality of cycles of the exposure operation.

20. A camera according to claim 17, wherein said timer circuit means includes a circuit which is capable of varying the time interval of delivery of the signals.

21. A camera having a timer-assisted photographing mode control device, comprising:
   (a) timer circuit means capable of automatically delivering signals relating to starting of a plurality of exposure operations to effect at least one photographing operation during a predetermined time interval;
   (b) camera control circuit means having a single-shot mode in which an exposure operation and a subsequent exposure preparation operation are executed in response to exposure start signal which is produced in response to an exposure operation, and a continuous-shooting mode in which the exposure operation and the exposure preparation operation are alternately repeated over a period in which the exposure start signal is continuously maintained; and
   (c) change-over circuit means for forcibly selecting the continuous-shooting mode when a timer-assisted photographing operation is to be conducted.

22. A camera according to claim 21, wherein said change-over circuit means is automatically reset to an initial condition when the timer-assisted photographing operation terminates.

23. A camera according to claim 21, wherein said timer circuit means is capable of delivering, in each of a plurality of periods which are set at a predetermined time interval, signals relating to starting of a plurality of cycles of the exposure operation.

24. A camera according to claim 21, wherein said timer circuit means comprises means for varying said time interval of delivery of said signal.

* * * * *

UNITED STATES PATENT AND TRADEMARK OFFICE
CERTIFICATE OF CORRECTION

PATENT NO. : 4,952,967
DATED : August 28, 1990
INVENTOR(S) : Kazumi, et al.

It is certified that error appears in the above-identified patent and that said Letters Patent is hereby corrected as shown below:

COLUMN 2:

Line 37, "on the" should read --the on--.

COLUMN 4:

Line 47, "turning" should read --turning off--.

COLUMN 6:

Line 14, "timner-assisted" should read --timer-assisted--.

COLUMN 10:

Line 64, "witch" should read --switch--.

COLUMN 11:

Line 17, "the" (second occurrence) should be deleted.

UNITED STATES PATENT AND TRADEMARK OFFICE
CERTIFICATE OF CORRECTION

PATENT NO. : 4,952,967

DATED : August 28, 1990

INVENTOR(S) : Kazumi, et al.

It is certified that error appears in the above-identified patent and that said Letters Patent is hereby corrected as shown below:

COLUMN 13:

Line 7, delete "is"; and

Line 8, delete "obtained".

COLUMN 14:

Line 39, "circuit" should read --circuits--.

Signed and Sealed this

Twelfth Day of May, 1992

Attest:

DOUGLAS B. COMER

*Attesting Officer*    *Acting Commissioner of Patents and Trademarks*